Patented May 19, 1942

2,283,174

UNITED STATES PATENT OFFICE 2,283,174

METHOD OF PREPARING COMPOSITE MATERIALS FOR CONTACTING OPERATIONS

John R. Bates, Swarthmore, Pa., and George R. Bond, Jr., Paulsboro, N. J., assignors to Houdry Process Corporation, Wilmington, Del., a corporation of Delaware No Drawing. Application April 26, 1939, Serial No. 270,202

3 Claims. (Cl. 252—259)

This invention relates to improved contact material for promoting or producing reactions involving fluids. More particularly it is concerned with a composite material and manner of producing the same, which is characterized by improved physical qualities adapting it to various uses as well as intensive and rigorous conditions of use over long periods of time. The contact material of the present invention may be used in chemical transformations such, for example, as those comprehended by the terms synthesis, decomposition, metathesis and the like and when effecting the reactions the contact material may be arranged in converters and operated in any suitable or desired manner as disclosed, for example, in Patent No. 1,828,146 issued October 20, 1931, to Alfred Joseph, in Patent No. 1,867,842 and No. 2,042,469 issued July 19, 1932, and June 2, 1936, respectively, to the same inventor, or in Patent No. 2,042,468 issued June 2, 1936, to E. J. Houdry.

It has been recognized that natural earth, such as varieties of clays, fuller's earth, diatomaceous earth, etc., especially those containing silicate of alumina, are particularly useful as catalysts or filtering material and that the catalytic or adsorptive powers of these natural agents may be increased by subjecting the material to a hydrochloric or sulphuric acid treatment. It is also known that the adsorptive and/or absorptive properties of the natural earths, particularly those containing silicate of alumina or synthetic compositions containing blends of silica and alumina may be further enhanced through mechanically or otherwise treating the materials by changing their cellular structure to increase their porosity. These treated materials have been used alone as active catalysts, or as active carriers for other catalytic materials, and also after subjection to additional treatment have been used as inert or substantially inert masses when little or no activity is required or as inactive carriers for other active materials. Although these materials have gone into extensive commercial use, practical difficulty has been experienced in obtaining a final product having the desired activity and/or porosity for a particular use, because of the high temperature heat treatments which are necessary to provide the requisite strength for withstanding long and continuous contact with fluids. To obtain sufficient hardness it has been necessary to sacrifice the activity or porosity of the materials while the materials having sufficient activity or porosity were not sufficiently strong to prevent their crumbling, spalling or otherwise breaking down after short periods of use. This is true, particularly when the materials have diluents added thereto, for example, when they are treated to increase their porosity by the addition of an organic filler which is later removed or when an active agent is incorporated therein, since the body of the material is weakened, in the first instance, in the formation of the enlarged cell structure and, in the second instance, by the presence of the other ingredient such as metallic oxides or other metallic compounds which tend to reduce the plasticity and bonding qualities of the material. When these weakened materials are molded into small pellets, as is customary, it is necessary, in order to obtain the requisite strength and hardness, to bake or heat treat the same at temperatures sometimes higher, by 300° or more, than before they were weakened by the added diluents which detracts from the practical economy of production. It has been proposed to add ingredients to the treated or weakened materials in order to make up for the reduced strength and to decrease the temperature necessary to obtain the desired strength and hardness but the necessary volumetric proportion of these added ingredients has been so great that the adsorptive and/or absorptive powers of the material are adversely affected. From the above observations, which are a result of an intensive study of contact materials now in use, it has been determined, in order to obtain the essential requirements of a highly serviceable contact mass from the natural silicates of alumina as well as from artificial blends or compounds of silica and alumina, that it is at times necessary to incorporate in the materials an agent having very great binding and strengthening qualities for the cell structure of the material and/or the added active ingredient, but which at the same time will occupy a minimum of space and represent only a very small proportionate volume of the composite material. One object, therefore, of this invention is to produce a composite contact material containing such a desired agent. Another object is to overcome the practical difficulties heretofore encountered in producing a serviceable contact material. Another object is to produce such a contact material having the requisite qualities which adapt it to a wide variety of uses. Still another object is to produce a material which remains physically unimpaired over long periods of use. Other objects will become apparent from the following detailed description.

As a result of extensive research and investigation it was found that hydrous silicates of alumina of the type having great swelling properties had also the necessary cohesive and adhesive qualities to provide strength and toughness when added to a base of low-swelling or non-swelling material and that only a very small amount was necessary to obtain the required hardness under commercially practical temperature treatments without adversely affecting the adsorptive and/or absorptive properties of the base material. The swelling property of the added ingredient is of prime importance in the production of the improved contact material and for good results it should be capable of expanding to at least 5 times its dry volume, but the most satisfactory results are had when its expansion upon the addition of a liquid is ten or more times its dry volume. A particularly good ingredient for this purpose is the plastic high-swelling or true bentonite which is found in natural form in eastern Wyoming and its adjacent regions since it has a swelling ability of about fifteen times its dry volume and takes up more than fifteen times its own weight of water in forming a colloidal dispersion and even becomes highly plastic on the addition of five or six times its own weight of water. High-swelling bentonite, although normally reversible at low temperatures, that is, having the power of swelling upon the addition of water and returning to its original condition upon being dried and swelling again when water is added, begins to lose its swelling propensity at temperatures above 450° F. which is practically destroyed on heating above 800° F. or 900° F. and the bentonite becomes irreversible. In a paste or colloidal state the coherent property of this bentonitic clay is very great but is not very adherent. However, upon baking at high temperatures it becomes strongly adherent as well as coherent and forms a strong, tough binder. Only a very small percentage by weight of this high swelling clay need be added to the non-swelling base material to provide the requisite strength for a good contact material but when sufficient liquid is used to place the swelling bentonite in a colloidal state its volume may be equal to and even greater than that of the base material but upon baking and high temperature treatment of the composition, the bentonite is reduced substantially to its initial volume and occupies a minimum of space in the final product.

The true bentonite, due to its great swelling properties, is not of much value alone as an active contact material because of the great amount of shrinkage which takes place upon drying and heating which decreases the porosity of the bentonite and also because of the fact that it has a tendency to check and break up. However, it is excellent for use as a binder for other base materials including non-swelling or low-swelling clays since only a very small proportion of the high-swelling bentonite is required to form a highly serviceable composition. For contact materials which are treated to attain visible porosity the percentage of high-swelling bentonite necessary to obtain the requisite strength and hardness is never more than 15% and usually less than 10% is required. For materials which are highly porous but not visibly porous, the percentage of bentonite necessary to act as the strengthening agent may be as low as 2%. When the base material has an active material such as a metallic oxide or compound incorporated therewith in a normal amount up to about 20 or 25% by weight, the amount of bentonite required will usually not be more than 5% in order to provide the requisite hardness and strength.

By way of further explaining the qualities of the new composition, general strength or hardness comparisons will be given between contact masses which are now in practical use for certain reactions involving organic materials, as in the transformation, decomposition or other treatment of hydrocarbons or their derivatives, but which do not contain a high-swelling clay such as the true bentonite, and contact masses which have small amounts of the high-swelling bentonite incorporated therein. The particular device used in making the comparisons had a knife edge which was positioned on the molded pellet and the moment of force necessary to fracture or crush the pellet was determined by adding weight to the device until the structure of the pellet became ruptured and the force required to rupture the tested pellets was indicated in grams of hardness. The base hydrosilicate of alumina used in making the comparison tests was a low-swelling type of clay which had received a hydrochloric or sulfuric acid treatment for removing impurities and providing activity. It was found, when the activated clay above referred to was mixed with sufficient water to form a plastic mass and the pellets extruded, that a temperature of at least 1050° F. was required to obtain a hardness or crushing force of approximately 3000 grams while, with the same mixture having about 2% by weight of the high-swelling bentonite added thereto a temperature of slightly below 1050° F. produced a hardness or crushing strength of more than 6000 grams. A visibly porous contact material formed from the same base clay without the addition of the high-swelling bentonite required a temperature of more than 1800° F. in order to obtain a hardness of about 3000 grams, while after the addition of about 10% by weight of the high-swelling bentonite a temperature of only 1450° F. was necessary to obtain a hardness of over 4000 grams. The increased amount of high-swelling bentonite necessary for the visibly porous mass is due to the weakening of the base material in forming enlarged cells therein and for a less porous mass, a smaller amount of bentonite would be required. In comparing the effect of the high-swelling bentonite on the base clay when mixed with an active metallic oxide, it was found that a mixture of 20 per cent by weight of metallic oxide with the base clay alone required a heat treatment of 1050° F. in order to obtain a hardness of about 3000 grams, while with the addition of about 4 per cent of the high-swelling bentonite a hardness of over 7000 grams was obtained at a temperature of 1050° F.

From experiments, it was shown that in forming a visibly porous contact material, the addition of 5% by volume of the high-swelling bentonite increased the strength and hardness over three times that of the hardness of the base material alone when heat treated under similar conditions. For example, when 90 parts of activated hydrosilicate of alumina was mixed with 25 parts of wood flour and heat treated for two hours at 1400° F. the hardness was determined to be around 1000 grams, while the same mixture with 10 parts of high-swelling bentonite, heat treated under the same conditions, gave a hardness approaching 4000 grams. In making the same type of contact material 100 parts of activated hydrosilicate of alumina and 60 parts of corn meal, heat treated at 1400° F. for two hours, gave a hardness of about 950 grams, while the same mixture with the addition of 10 parts of high-swelling bentonite and heat treated under the same conditions gave a hardness in the neighborhood of 3000 grams. It was also found when the base hydrosilicate of alumina and a metallic oxide were mixed with 3 or 4% by volume of the high-swelling bentonite that the hardness of the composition was more than doubled. For example, 150 parts of the base hydrosilicate of alumina and about 30 parts of copper oxide, heat treated at 1050° F. for 2 hours, gave a hardness of around 3000 grams, while the same mixture having 8 parts of high-swelling bentonite added thereto and heat treated under the same conditions, gave a hardness of over 7000 grams. Compositions containing other active metals or their oxides such as vanadium, chromium, nickel and iron when added to the base material in about the same volumetric proportion as the copper oxide attain a hardness of over 7000 grams by the addition of about 4 per cent by volume of the high-swelling bentonite. The composition of the base hydrosilicate of alumina and a sufficient amount of the high-swelling bentonite depending on the porosity and hardness desired may be used also as a carrier for the active metals or oxides above referred to, in which case the active materials may be deposited therein by impregnation of the composition with a solution of the metallic oxide or compound.

Typical examples of compositions useful in the transformation, decomposition or other treatment of hydrocarbons which were made up of a base clay and a small portion of the high-swelling bentonite and then molded into pellets of 2 mm. penetration depth are as follows:

1. For forming a visibly porous contact material 90 parts of the base non-swelling clay was dry mixed with 70 parts of an organic filler which, in the particular example was corn meal, and to this mixture a colloidal dispersion of the high-swelling bentonite equal to about 10% by dry weight of the non-swelling clay was added. After mixing for about 20 minutes the composition was extruded in pellet form and heated at 1150° F. in order to burn out the corn meal and prevent the formation of a practically incombustible refractory coke which was found to be formed when the corn meal was burned off at higher temperatures. After the organic filler had burned off the temperature was raised to about 1450° F. and the pellets heat treated for about 2 hours at this temperature and a hardness of over 4000 grams obtained.

2. For forming a highly but not visibly porous contact mass the base non-swelling clay was prepared in finely divided form by grinding and about 2 per cent by dry weight of the high-swelling bentonite having sufficient water added to form a colloidal dispersion of greatly increased volume was added. The two ingredients were thoroughly mixed for about 20 minutes, and the molded pellets after low temperature drying, were heated treated at 1050° F. for about two hours and a hardness in the neighborhood of 6000 grams was obtained.

3. A composition containing a metallic oxide, active ingredient was formed of 150 lbs. of the base non-swelling clay and 8 lbs. by weight, or about 4 per cent of the high-swelling clay in colloidal state with an added 30 pounds of copper oxide and the ingredients mixed for about 20 minutes, after which the formed pellets were heat treated at 1050° F. and a hardness of over 7000 grams was obtained. Further comparisons of these compositions when used as combustion catalysts or oxygen promoters showed that before the high-swelling bentonite was added the structure of the pellets broke down due to the severity of the internal strains occurring when the catalyst changed from an oxide to the metal when giving up oxygen and in changing back to an oxide when taking on oxygen. However, the addition of only 4 per cent of high-swelling bentonite provided the necessary strength and hardness so as to be unaffected by the internal strains.

Although good compositions have resulted from various methods of mixing the finely divided base material and the high-swelling bentonite, it was found that the best method of preparing the mixture was to first form a paste or dispersion of the high-swelling bentonite by adding the same in finely divided form to a sufficient amount of water and thoroughly mixing for about 30 minutes to obtain a smooth consistency and then adding the dispersed bentonite to the base adsorptive material or to a mixture of the adsorptive clay and organic filler or metal compound. It was found by mixing the composition in this particular manner that the consistency of the mixture was such that it could be readily extruded under low extrusion pressures without the necessity of adding a lubricant such as kerosene to the mixture, which had been a common expedient in the preparation of extrudible contact masses heretofore. It was also found with this particular method of preparing the composition that greater hardness could be obtained during a particular heat treatment than could be obtained by any other methods of forming the composition.

It will be readily seen from the above detailed discussion that the invention is applicable to a wide variety of base materials having a low degree of coherence, including metal or other oxides of natural or artificial origin, or mixtures or compounds of such oxides, as for example, rare earths, clays, silica gel alumina, blends of silica and alumina, etc., and that the addition of a small portion of high-swelling bentonite to one or a mixture of more than one of these materials provides tough and strong compositions which will attain a hardness much greater than that obtainable without the added high-swelling bentonite, under similar conditions of heat treatment. Also, that a highly serviceable composition is provided which may attain the requisite hardness to afford practically indefinite use as a contact mass, under heat treating conditions which do not destroy the activity of the original base material.

When the term "knife edge" is used in the specification and claims, reference is made to a knife edge of the type commonly used to provide bearing surfaces or fulcrums in analytical and other laboratory balances and the diameter of the molded pellets on which the strength tests were made were about 2 mm. or the same diameter as the specimens on which the tests are usually made, as disclosed in Patent No. 2,146,718 issued to George R. Bond, Jr., on February 14, 1939, reissued January 14, 1941, as Re. 21,690.

We claim as our invention:

1. The method of preparing a contact material containing a high-swelling bentonite and an adsorptive clay which comprises the steps of adding the bentonite in finely divided form to a sufficient quantity of liquid to form a paste-like dispersion of the bentonite by mixing the same until a smooth consistency is obtained, then adding the bentonite to a body of the adsorptive clay and thoroughly mixing the ingredients, molding the mixture by extruding to form pellets of uniform size and shape and then heat treating the pellets at a temperature above 900° F. sufficiently long to provide porous rigid hard units which are uniformly resistant to deformation over prolonged periods of use.

2. The method of making contact material which comprises the steps of first preparing a mixture of adsorptive clay and a diluent material, then preparing a colloidal dispersion of high-swelling bentonite by mixing less than 5 per cent by volume of the bentonite with water, then forming a composite mass by mixing the bentonite preparation with the adsorptive clay and diluent preparation, molding the composition by extruding to form pellets of uniform size and shape and heat treating the pellets in the neighborhood of 1050° F. to provide porous, rigid and hard units which are uniformly resistant to deformation over prolonged periods of use.

3. The method of making contact material which comprises the steps of mixing finely divided particles of organic filler into a body of adsorbent silicious material, adding a small portion of high swelling bentonite which is mixed to form a paste-like dispersion to provide a composite mass, molding the mass into pellets of uniform size and shape, heating said pellets at about 1150° F. until the organic filler is removed, then heat treating the pellets at about 1400° F. sufficiently long that a cylindrical test specimen of about 2 mm. diameter will support at least 3000 grams concentrated load applied across its axis.

JOHN R. BATES.
GEORGE R. BOND, Jr.